US007876692B2

(12) United States Patent
Rogers

(10) Patent No.: US 7,876,692 B2
(45) Date of Patent: **\*Jan. 25, 2011**

(54) EMPIRICAL SCHEDULING OF NETWORK PACKETS USING A PLURALITY OF TEST PACKETS

(75) Inventor: Steven A. Rogers, Portsmouth, NH (US)

(73) Assignee: NDS Imaging Holdings, LLC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/336,743

(22) Filed: Dec. 17, 2008

(65) Prior Publication Data

US 2009/0141626 A1    Jun. 4, 2009

Related U.S. Application Data

(63) Continuation of application No. 10/975,019, filed on Oct. 28, 2004, now Pat. No. 7,468,948, which is a continuation-in-part of application No. 10/663,378, filed on Sep. 17, 2003, now Pat. No. 7,529,247.

(51) Int. Cl.
*H04L 12/26* (2006.01)
*H04L 12/56* (2006.01)

(52) U.S. Cl. ....................... 370/241; 370/458
(58) Field of Classification Search .............. None
See application file for complete search history.

(56) References Cited

U.S. PATENT DOCUMENTS 4,745,593 A    5/1988 Stewart
4,821,259 A    4/1989 DeBruler et al.
5,271,000 A    12/1993 Engbersen et al.
5,373,504 A    12/1994 Tanaka et al.

(Continued)

FOREIGN PATENT DOCUMENTS

EP    0827307    3/1998

(Continued)

OTHER PUBLICATIONS

Yi Du and Gerald M. Mason, "Enhancing accuracy of probe packet-based congestion detection in high speed Networks", IEEE 1998.

(Continued)

*Primary Examiner*—Min Jung
(74) *Attorney, Agent, or Firm*—Banner & Witcoff, Ltd.

(57) ABSTRACT

A method of transmitting packets over a network includes steps of transmitting a first plurality of test packets during a first plurality of time locations that are coarsely spaced apart in time; determining which of the first plurality of time locations corresponds to favorable network traffic conditions; transmitting a second plurality of test packets over the network during a second plurality of time locations that are finely spaced apart in time, wherein the second plurality of time locations are selected on the basis of favorable network traffic conditions; determining which of the second plurality of time locations corresponds to favorable network traffic conditions; and transmitting data packets over the network using one or more favorable time locations determined by the finely spaced test packets. The method can be used to "zero in" on congested network periods by detecting differences in packet latencies among test packets.

48 Claims, 12 Drawing Sheets

U.S. PATENT DOCUMENTS

| | | | |
|---|---|---|---|
| 5,408,465 A | 4/1995 | Gusella et al. | |
| 5,432,775 A | 7/1995 | Crayford | |
| 5,455,865 A | 10/1995 | Perlman | |
| 5,477,531 A | 12/1995 | McKae et al. | |
| 5,517,620 A | 5/1996 | Hashimoto et al. | |
| 5,541,921 A | 7/1996 | Swenson et al. | |
| 5,563,875 A | 10/1996 | Hefel et al. | |
| 5,610,903 A | 3/1997 | Crayford | |
| 5,734,656 A | 3/1998 | Prince et al. | |
| 5,774,668 A | 6/1998 | Choquier et al. | |
| 5,781,534 A | 7/1998 | Perlman et al. | |
| 5,859,835 A | 1/1999 | Varma et al. | |
| 5,859,979 A | 1/1999 | Tung et al. | |
| 5,917,822 A | 6/1999 | Lyles et al. | |
| 5,974,056 A | 10/1999 | Wilson et al. | |
| 6,047,054 A | 4/2000 | Bayless et al. | |
| 6,058,117 A | 5/2000 | Ennamorato et al. | |
| 6,067,572 A | 5/2000 | Jensen et al. | |
| 6,088,361 A | 7/2000 | Hughes et al. | |
| 6,134,589 A | 10/2000 | Hultgren | |
| 6,201,791 B1 * | 3/2001 | Bournas | 370/234 |
| 6,201,819 B1 | 3/2001 | Luders | |
| 6,208,666 B1 | 3/2001 | Lawrence et al. | |
| 6,240,084 B1 | 5/2001 | Oran et al. | |
| 6,247,061 B1 | 6/2001 | Douceur et al. | |
| 6,272,131 B1 | 8/2001 | Ofek | |
| 6,295,285 B1 | 9/2001 | Whitehead | |
| 6,359,855 B1 | 3/2002 | McPherson et al. | |
| 6,360,271 B1 | 3/2002 | Schuster et al. | |
| 6,373,822 B1 | 4/2002 | Raj et al. | |
| 6,377,579 B1 | 4/2002 | Ofek | |
| 6,385,198 B1 | 5/2002 | Ofek et al. | |
| 6,426,814 B1 | 7/2002 | Berger et al. | |
| 6,426,944 B1 | 7/2002 | Moore | |
| 6,456,675 B2 * | 9/2002 | Wagner et al. | 375/347 |
| 6,480,506 B1 | 11/2002 | Gubbi | |
| 6,487,593 B2 * | 11/2002 | Banks | 709/224 |
| 6,496,477 B1 | 12/2002 | Perkins et al. | |
| 6,502,135 B1 | 12/2002 | Munger et al. | |
| 6,529,480 B1 | 3/2003 | Stewart et al. | |
| 6,556,564 B2 | 4/2003 | Rogers | |
| 6,560,222 B1 | 5/2003 | Pounds et al. | |
| 6,574,193 B1 | 6/2003 | Kinrot | |
| 6,611,519 B1 | 8/2003 | Howe | |
| 6,618,360 B1 | 9/2003 | Scoville et al. | |
| 6,618,761 B2 | 9/2003 | Munger et al. | |
| 6,628,629 B1 | 9/2003 | Jorgensen | |
| 6,633,544 B1 | 10/2003 | Rexford et al. | |
| 6,700,875 B1 * | 3/2004 | Schroeder et al. | 370/252 |
| 6,711,137 B1 | 3/2004 | Klassen et al. | |
| 6,731,600 B1 | 5/2004 | Patel et al. | |
| 6,778,536 B1 | 8/2004 | Ofek et al. | |
| 6,791,997 B2 | 9/2004 | Beyer et al. | |
| 6,871,078 B2 | 3/2005 | Nishioka et al. | |
| 6,885,641 B1 | 4/2005 | Chan et al. | |
| 6,914,900 B1 | 7/2005 | Komatsu et al. | |
| 6,999,422 B2 | 2/2006 | Ishioka | |
| 7,080,160 B2 | 7/2006 | Cognet et al. | |
| 7,116,639 B1 | 10/2006 | Gail et al. | |
| 7,187,669 B1 * | 3/2007 | Lee | 370/347 |
| 7,197,010 B1 | 3/2007 | Berstein et al. | |
| 7,200,159 B2 | 4/2007 | Gronbach | |
| 7,468,948 B2 * | 12/2008 | Rogers | 370/241 |
| 7,529,247 B2 * | 5/2009 | Rogers | 370/395.2 |
| 2001/0033565 A1 | 10/2001 | Rogers | |
| 2001/0033649 A1 | 10/2001 | Rogers | |
| 2002/0010792 A1 | 1/2002 | Border et al. | |
| 2002/0031144 A1 | 3/2002 | Barton | |
| 2002/0044557 A1 | 4/2002 | Isoyama | |
| 2002/0054611 A1 | 5/2002 | Seta | |
| 2002/0075891 A1 | 6/2002 | Souissi | |
| 2002/0080719 A1 | 6/2002 | Parkvall et al. | |
| 2002/0086641 A1 | 7/2002 | Howard | |
| 2002/0110129 A1 | 8/2002 | Matsuoka et al. | |
| 2002/0186660 A1 | 12/2002 | Bahadiroglu | |
| 2002/0191592 A1 | 12/2002 | Rogers et al. | |
| 2003/0012163 A1 | 1/2003 | Cafarelli et al. | |
| 2003/0021287 A1 | 1/2003 | Lee et al. | |
| 2003/0058880 A1 | 3/2003 | Sakinen et al. | |
| 2003/0067903 A1 | 4/2003 | Jorgensen | |
| 2003/0107991 A1 | 6/2003 | Tezuka et al. | |
| 2003/0117959 A1 | 6/2003 | Taranov | |
| 2003/0188188 A1 | 10/2003 | Padmanabhan et al. | |
| 2003/0208729 A1 | 11/2003 | Giddens et al. | |
| 2003/0219029 A1 | 11/2003 | Pickett | |
| 2004/0008655 A1 | 1/2004 | Park et al. | |
| 2004/0014491 A1 | 1/2004 | Weigand | |
| 2004/0024550 A1 | 2/2004 | Doerken et al. | |
| 2004/0100929 A1 | 5/2004 | Garcia-Luna-Aceves | |
| 2004/0160340 A1 | 8/2004 | Thomson et al. | |
| 2004/0160916 A1 | 8/2004 | Vukovic et al. | |
| 2004/0179530 A1 | 9/2004 | Verbesselt et al. | |
| 2005/0058083 A1 | 3/2005 | Rogers | |
| 2005/0086362 A1 | 4/2005 | Rogers | |
| 2005/0088362 A1 | 4/2005 | Lin et al. | |
| 2005/0097619 A1 | 5/2005 | Haddad | |
| 2006/0045100 A1 | 3/2006 | Klasberger et al. | |
| 2006/0168336 A1 | 7/2006 | Koyanagi et al. | |
| 2009/0207732 A1 * | 8/2009 | Rogers | 370/232 |

FOREIGN PATENT DOCUMENTS

| | | |
|---|---|---|
| EP | 1035742 | 9/2000 |
| JP | 04-056322 | 2/2004 |
| WO | 00/28705 | 5/2000 |
| WO | 00/28706 | 5/2000 |
| WO | 01/47162 | 6/2001 |
| WO | 01/50146 | 7/2001 |
| WO | 01/59994 | 8/2001 |
| WO | 01/60029 | 8/2001 |
| WO | 0225821 B2 | 3/2002 |
| WO | 02/41505 | 5/2002 |
| WO | 02/100023 A2 | 12/2002 |
| WO | 02/100023 A3 | 12/2002 |
| WO | 03/084137 | 10/2003 |

OTHER PUBLICATIONS

PCT International Search Report dated May 24, 2006.

Official Communication, AU 2004275282, Mail date Sep. 2, 2009.

The Desk Area Network; Mark Hayter and Derek Mcauley; May 1991; Abstract pp. 11.

Business Communications Review; Sep. 2003; "Circuit-y New Choices for IP Networks" pp. 18-24.

IEEE Communications Magazine Oct. 2003; Topics in Internet Technology: "Packet Sequencing: a Demterministic Protocol for QoS in IP Networks" Sean S.B. Moore and Curtis A. Siller, Jr., Cetacean Networks, Inc.' pp. 98-107.

Packet Sequencing: A layer -2 Wan Switching Technology for Per-Flow Ideal QoS and Secure IP Networking; Steven A. Rogers, Sean S.B. Moore and Curtis A. Siller, Jr.; Abstract pp. 1-6.

Cetacean Networks; www.cetacean.com "Cost-Effective IP Networks for High Quality Videoconferencing" Nov. 2002; pp. 1-9.

Copyright @ 2003, Cetacean Networks, Inc.; A Deterministic Protocol for QoS in IP Networks Packet Sequencing; Steven A. Rogers, Sean S.B. Moore, Ph.D. and Curtis A. Siller, Jr., Ph.D.; Abstract pp. 1-18.

Copyright @ 2002, Cetacean Networks, Inc.; IP Videoconferencing Solution Performance: Packet Sequencing vs. Prioritization; pp. 1-8.

Copyright @ 2003; MultiService Converged IP Networks; Sean S.B. Moore, Ph.D.; Cetacean Networks, Inc.: pp. 1-10.

Copyright @ 2001; Practical Limits on Network Utilization in Converged IP Networks; Sean S.B. Moore, Ph.D.; Cetacean Networks, Inc.: pp. 1-2.

Clark, M; Jeffay, K; Application -level Measurements of Performance on the vBNS Multimedia Computing and Systems, 1999. IEEE International Conference on Jun. 1999, vol. 2, 7-11, pp. 362-366 vol. 2.

Official Communication, CA 2,538,751; Mail date Feb. 11, 2010.

* cited by examiner

EMPIRICAL SCHEDULING OF NETWORK PACKETS USING A PLURALITY OF TEST PACKETS

CROSS-REFERENCE TO RELATED APPLICATIONS

This is a continuation of allowed U.S. application Ser. No. 10/975,019, filed on Oct. 28, 2004, which is a continuation-in-part of U.S. application Ser. No. 10/663,378, filed on Sep. 17, 2003.

BACKGROUND OF THE INVENTION

The present invention relates generally to a system for allowing devices connected to a network (e.g., an IP or Ethernet network) to collaborate with other such devices so as to transmit and receive data packets without impairment on the network.

As is generally known, Ethernet and Internet Protocol (IP) are systems for transmitting packets between different points on a communications network. These switching systems are known as "contention-based" systems. That is, all transmitters contend for network resources. All transmitters may transmit simultaneously. If they do, then network resources may be oversubscribed. When this happens, data may be delayed or lost, resulting in network impairment.

As illustrated in FIG. 1, four streams of packets are input to a packet switch 112, which routes the packets to one or more outputs based on addressing information contained in each packet. Packets may arrive at the switch at unpredictable times, leading to bursts of inputs that must be handled. The switch typically maintains one or more packet queues 114 (e.g., one queue for each output port) that are able to store a small number of packets. The queue may comprise multiple queues arranged by packet priority level, such that priority 3 packets, for example, take precedence over priority 1 packets. If the inputs are too bursty, the queues fill up and some packets may be discarded. The higher-priority queues are typically emptied before the lower-priority queues, such that the lower-priority queues are more likely to lose data first.

IP systems suffer from impairments such as packet loss and jitter. This happens because there is no control over how many such packets reach a router at any given instant. If two packets arrive at a router at the same time, destined for the same port, one will have to be delayed. Both cannot be transmitted simultaneously. One of the packets will be saved in the queue until the first packet is completely transmitted.

FIG. 2 shows a computer network comprising endpoints 100, 101, 102, and 103. The network includes routers 104 through 107. As can be seen in the figure, if endpoints 100 and 101 communicate with endpoints 102 and 103 at the same time, a bottleneck may develop between routers 105 and 106. This may occur because too many packets may be simultaneously transmitted between the routers, causing the routers to discard overflow packets. This can happen even at low levels of average network utilization.

Various methods have been developed to overcome data loss on Ethernet and IP networks. The primary approach has been to use additional protocols to replace lost data. This is an after-the-fact solution. An example is the well-known Transmission Control Protocol (TCP). TCP is able to detect data loss and it causes retransmission of the data, until a perfect copy of the complete data file is delivered to the recipient device.

Many devices may be unable to use TCP or any retransmission method because it is far too slow. Real-time applications require delivery of data, accurately, the first time. For these applications to operate well, even the speed of light causes undesired delay. It is not feasible or desirable to add retransmission delay.

One problem is determining how to provide reliable, first-time delivery on a contention-based network. Various approaches have been tried. The most commonly proposed system relies on prioritization of data in the network. With this approach, data having real-time constraints is identified with priority coding so that it may be transmitted before other data.

Prioritization seems at first to be a good solution. However, on reflection it suffers from the same difficulty. Prioritization only provides a delivery advantage relative to the lower-priority data. It provides no advantage against the other priority data. Analysis and testing shows that this approach can work in certain circumstances, but only when the amount of priority data is small. For simple applications like voice, the percentage of the total may need to be 8% or less. Other applications must occupy an even smaller percentage of total network resource. As shown in FIG. 1, even high-priority packets may be discarded if too many high-priority packets are transmitted within a short time interval. For many networks this makes prioritization impractical.

Another approach is to multiplex the data. With this method the blocks of data associated with one flow of data are separated from the blocks of another. Multiplexing usually uses some type of time-domain system (known as Time Domain Multiplexing (TDM)) to separate flows. A central problem with multiplexing is that it eliminates a principal advantage of the network, namely that average bandwidth available to all is reduced. In other words, each potential transmitter on the network is guaranteed a slot of time on the network, even if that time is infrequently used. This leads to inefficient resource usage.

Asynchronous Transfer Mode (ATM) is another technology for multiplexing a data network, to reduce contention. ATM breaks all data flows into equal length data cells. Further, ATM can limit the number of data cells available to any flow or application. By overprovisioning the cells, so that there is always enough bandwidth for the maximum number of cells at any given moment, the result will be a virtual TDM system.

Both TDM and ATM provide contention reduction, but at the cost of considerable added complexity, cost, components, and lost bandwidth performance. Other approaches rely on specialized hardware to schedule packet delivery, driving up hardware costs.

SUMMARY OF THE INVENTION

Embodiments of the invention provide an empirically determined delivery schedule for packets that are to be delivered between two endpoints on a network. A transmitting node having the need to transmit packets according to a known data rate (e.g., to support a voice telephone call) transmits a series of test packets over the network to the intended recipient using different packet transmission times. The test packets are evaluated to determine which of the transmission times suffered the least latency, jitter, and/or packet loss, and those transmission times are used to schedule the packets for the duration of the transmission. Other endpoints use a similar scheme, such that each endpoint is able to evaluate which delivery schedule is best suited for transmitting packets with the least likely packet loss and latency. Different priority levels are used to transmit the data; the test packets; and other data in the network. The system empirically determines a desirable time schedule for transmission of data packets between two endpoints on the network.

According to one variation of the invention, an endpoint first transmits test packets that are widely (coarsely) spaced apart in time, in order to broadly explore those segments of time that may provide reliable delivery. Those coarse intervals that appear to provide reliable delivery service (e.g., those that show low latencies and/or dropped packet rates) are further explored by transmitting additional test packets that are finely-spaced apart during the coarse intervals that appear to be favorable. Finally (and optionally), the fine-grained time intervals can be further explored by transmitting yet further test packets that are spaced apart with extra-fine grained packet spacing.

DETAILED DESCRIPTION

According to one embodiment of the invention, a priority scheme is used to assign priority levels to data packets in a network such that delivery of packets intended for real-time or near real-time delivery (e.g., phone calls, video frames, or TDM data packets converted into IP packets) are assigned the highest priority in the network. A second-highest priority level is assigned to data packets that are used for testing purposes (i.e. so-called test packets). A third-highest priority level is assigned to remaining data packets in the system, such as TCP data used by web browsers.

Figure 1:
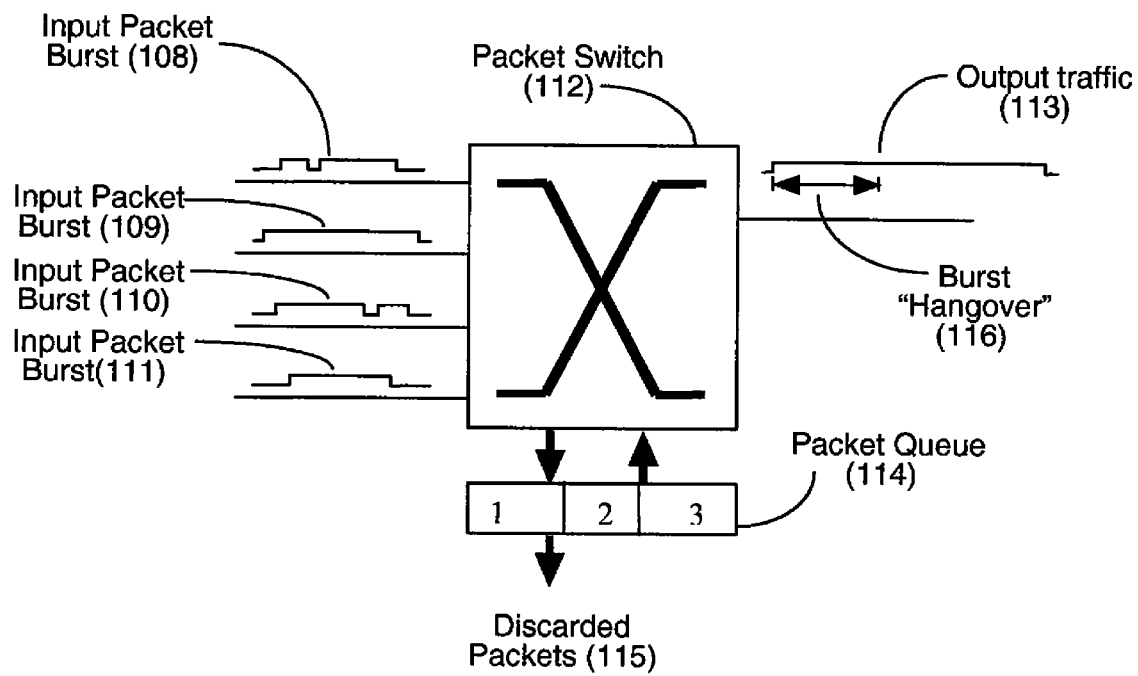
FIG. 1 shows the problem of bursty packets creating an overflow condition at a packet switch, leading to packet loss.
Figure 2:
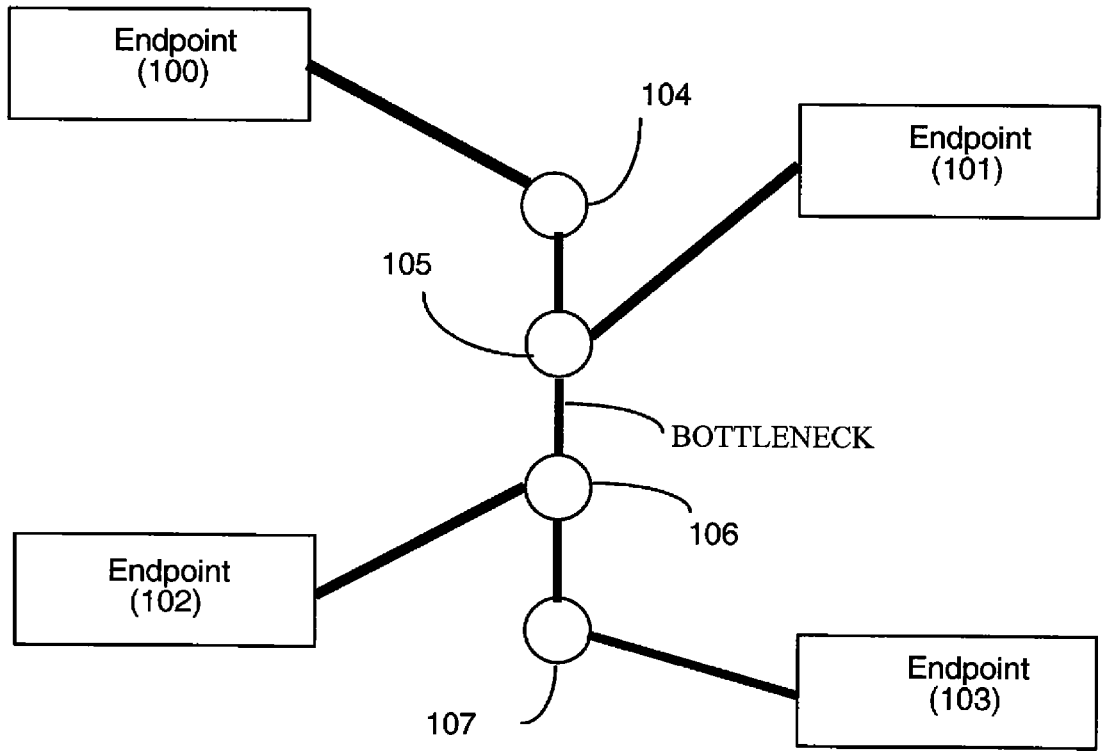
FIG. 2 shows how network congestion can lead to a bottleneck where two sets of endpoints share a common network resource under bursty conditions.
Figure 3:
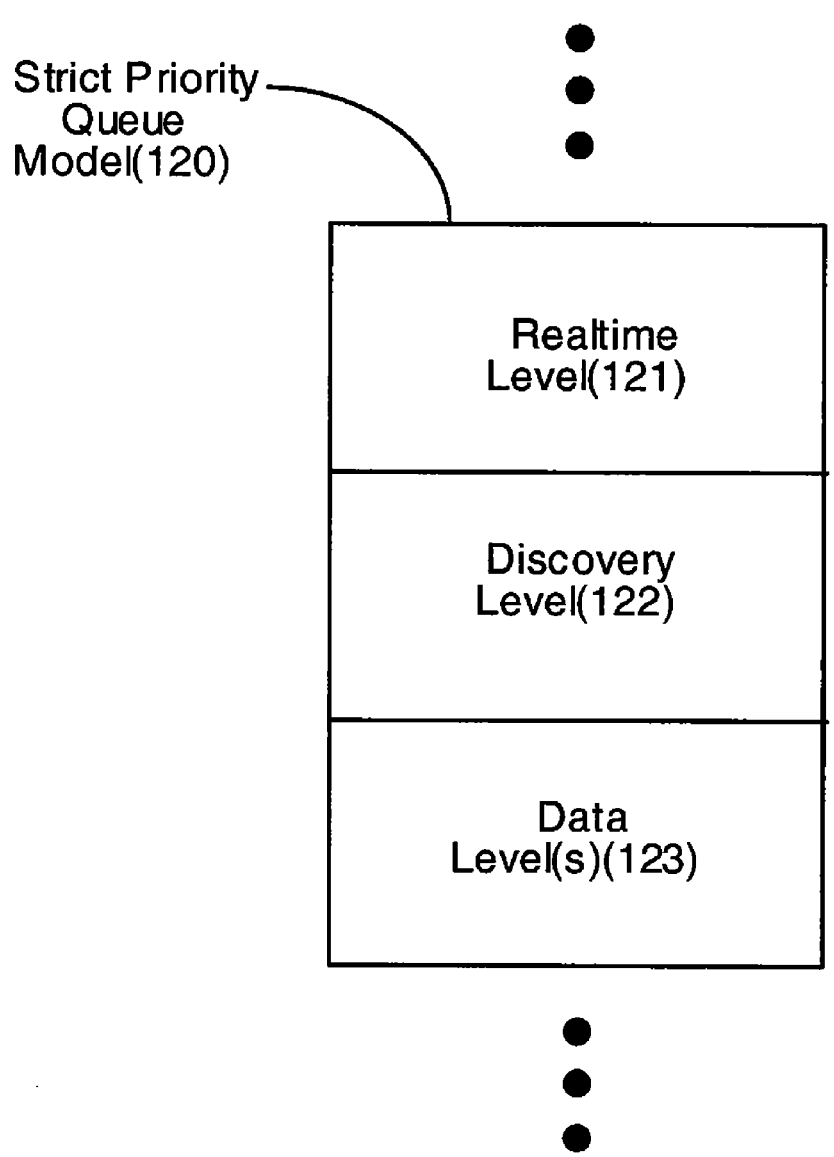
FIG. 3 shows one approach for assigning different priority levels to scheduled data (realtime level); test packets (discovery level); and other network traffic (data level).

FIG. 3 illustrates this scheme. These priority levels can be assigned by enabling the packet priority scheme already available in many packet routers. Other priority levels above and below these three levels can be accommodated as well. For example, a priority level above the real-time level can be assigned for emergency purposes, or for network-level messages (e.g., messages that instruct routers or other devices to perform different functions).

Figure 4:
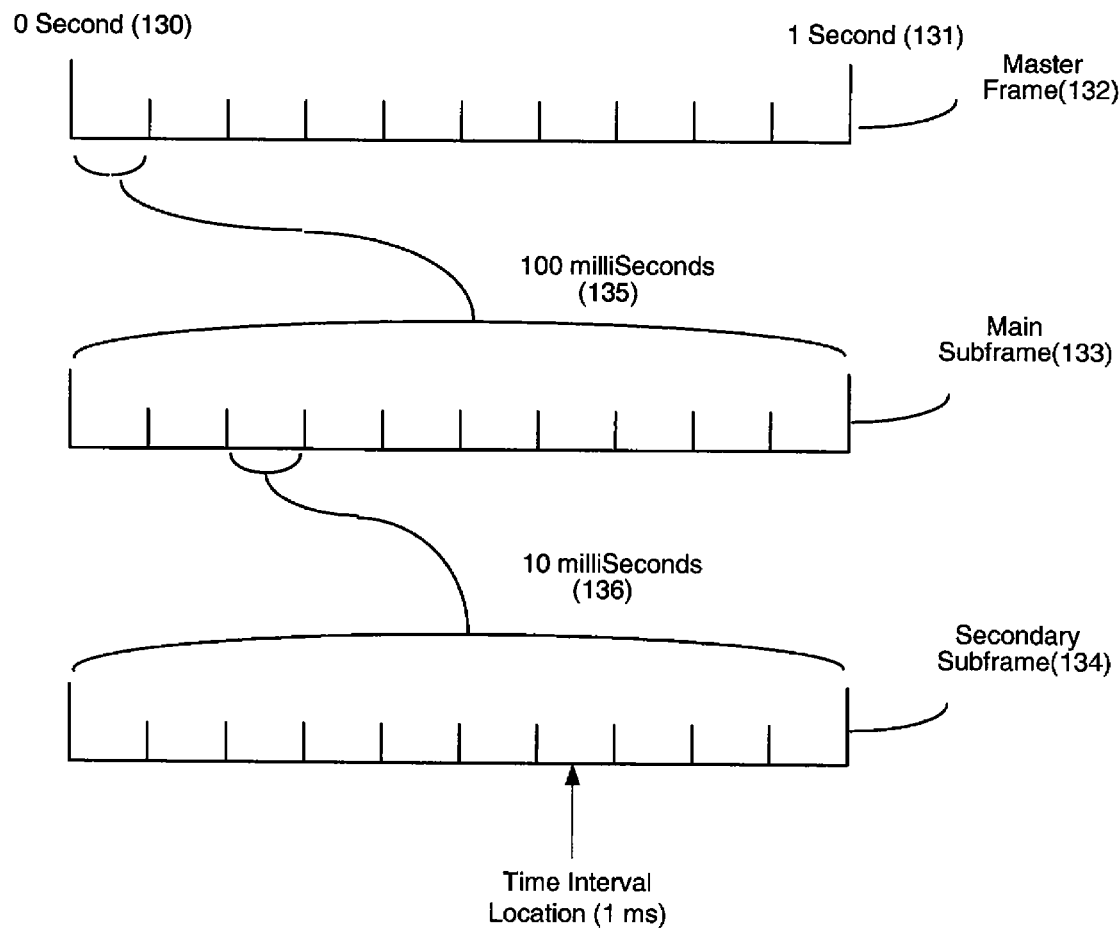
FIG. 4 shows a frame structure in which a delivery schedule can be decomposed into a master frame; subframes; and secondary subframes.

FIG. 4 shows how an arbitrary delivery time period of one second (a master frame) can be decomposed into subframes each of 100-millisecond duration, and how each subframe can be further decomposed into secondary subframes each of 10 millisecond duration. Each secondary subframe is in turn divided into time delivery locations of 1 millisecond duration. According to one variation of the invention, the delivery schedule for each period of transmission is decomposed using a scheme such as that shown in FIG. 4, and packets are assigned to one or more time locations according to this schedule for purposes of transmitting test packets and for delivering data. In this sense, the scheme may resemble conventional TDM systems. However, unlike TDM systems, no endpoint can be guaranteed to have a particular timeslot or timeslots. Instead, nodes on the network transmit using time locations that are empirically determined to be favorable based on the prior transmission of test packets between the two endpoints. (Note: the term "interval location" or "time interval location" or "time location" will be used rather than "time slot" in order to distinguish TDM systems). It should be understood that the time periods shown in FIG. 4 are for illustration only; other time periods, intervals, and decompositions could of course be used without departing from the inventive principles. Each time location can be numbered or identified using any of various schemes (e.g., consecutive numbering; numbering relative to a master frame, subframe, and secondary subframe, etc.).

Figure 5:
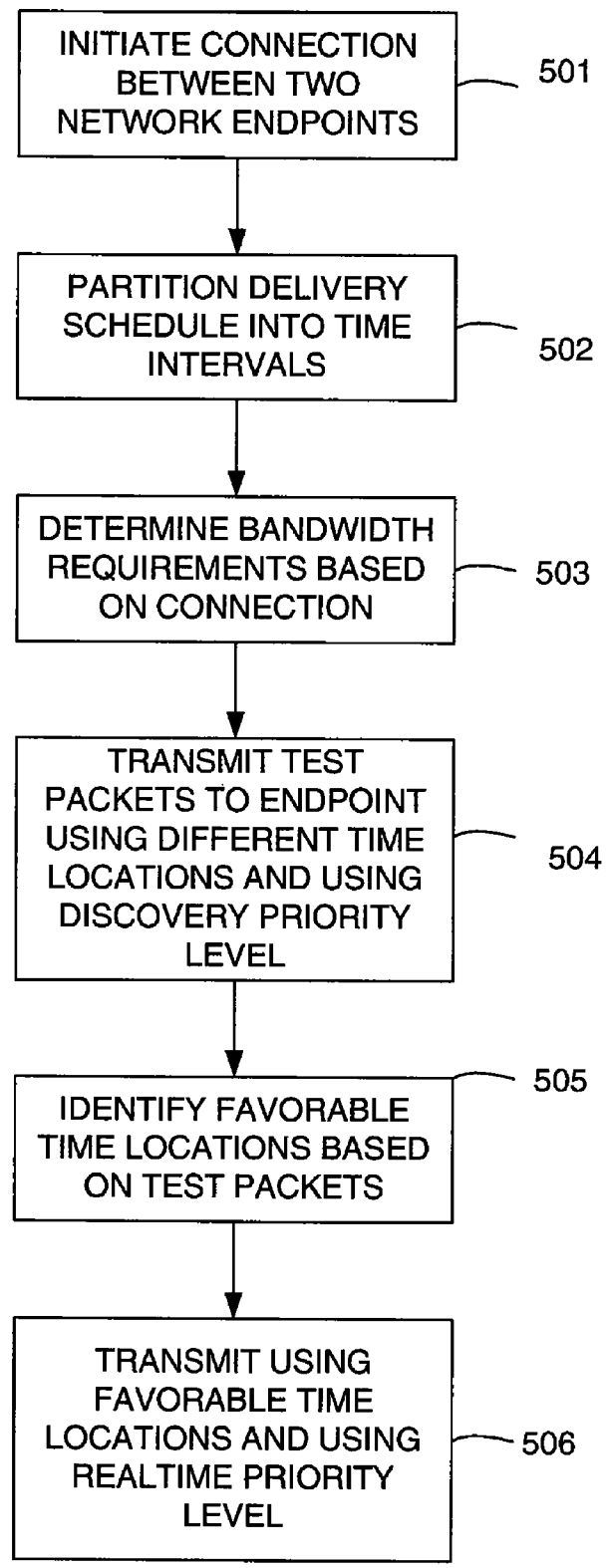
FIG. 5 shows a flow chart having steps for carrying out various principles of the invention according to one embodiment.

FIG. 5 shows method steps that can be used to carry out various principles of the invention. Beginning in step 501, a determination is made that two endpoints on the network (e.g., and Ethernet network or an IP network) desire to communicate. This determination may be the result of a telephone receiver being picked up and a telephone number being dialed, indicating that two nodes need to initiate a voice-over-IP connection. Alternatively, a one-way connection may need to be established between a node that is transmitting video data and a receiving node. Each of these connection types can be expected to impose a certain amount of data packet traffic on the network. For example, a voice-over-IP connection may require 64 kilobits per second transfer rate using 80-byte packet payloads (not including packet headers) with packets being sent every 10 milliseconds. A video stream would typically impose higher bandwidth requirements on the network.

Note that for two-way communication, two separate connections would normally be established: one for node A transmitting to node B, and another connection for node B transmitting to node A. Although the inventive principles will be described with respect to a one-way transmission, it should be understood that the same steps would be repeated at the other endpoint where a two-way connection is desired.

In step 502, a delivery schedule is partitioned into time interval locations according to a scheme such as that illustrated in FIG. 4. (This step can be done in advance and need not be repeated every time a connection is established between two endpoints). The delivery schedule can be derived from a clock such as provided by a Global Positioning System (GPS). As one example, an arbitrary time period of one second can be established for a master frame, which can be successively decomposed into subframes and secondary subframes, wherein each subframe is composed of 10 time intervals each of 10 milliseconds in duration and each secondary subframe is composed of 10 time intervals each of 1 millisecond in duration. Therefore, a period of one second would comprise 1,000 time locations each of 1 millisecond duration. Other time periods could of course be used, and the invention is not intended to be limited to any particular time scheme or decomposition approach.

In step 503, the required bandwidth between the two endpoints is determined. For example, for a single voice-over-IP connection, a bandwidth of 64 kilobits per second might be needed. Assuming a packet size of 80 bytes or 640 bits (ignoring packet overhead for the moment), this would mean that 100 packets per second must be transmitted, which works out to (on average) a packet every 10 milliseconds. Returning to the example shown in FIG. 4, this could be accomplished by transmitting a packet during at least one of the time locations in the secondary subframe at the bottom of the figure. (Each time location corresponds to one millisecond).

In step 504, a plurality of test packets are transmitted during different time locations at a rate needed to support the desired bandwidth. Each test packet is transmitted using a "discovery" level priority (see FIG. 3) that is higher than that accorded to normal data packets (e.g., TCP packets) but lower than that assigned to realtime data traffic (to be discussed below). For example, turning briefly to FIG. 6, suppose that the schedule has been partitioned into one millisecond time locations. The test packets might be transmitted during time locations 1, 3, 5, 7, 9, 11, and 12 as shown. Each test packet preferably contains the "discovery" level priority; a timestamp to indicate when the packet was sent; a unique sequence number from which the packet can be identified after it has been transmitted; and some means of identifying what time location was used to transmit the packet. (The time location might be inferred from the sequence number). The receiving endpoint upon receiving the test packets may return the packets to the sender, which allows the sender to (a) confirm how many of the sent packets were actually received; and (b) determine the latency of each packet. Other approaches for determining latency can of course be used. The evaluation can be done by the sender, the recipient, or a combination of the two. For example, the recipient could send back a report showing the receipt times for each packet and/or other statistics. One or more statistics messages can be sent providing statistics for a sequence of test packets.

In step 505, the sender evaluates the test packets to determine which time location or locations are most favorable for carrying out the connection. For example, if it is determined that packets transmitted using time location #1 suffered a lower average dropped packet rate than the other time locations, that location would be preferred. Similarly, the time location that resulted in the lowest packet latency (round-trip from the sender) could be preferred over other time locations having higher latencies. The theory is that packet switches that are beginning to be stressed would have queues that are beginning to fill up, causing increases in latency, jitter, and dropped packets. Accordingly, according to various inventive principles other time locations could be used to avoid transmitting packets during periods that are likely to increase queue lengths in those switches. In one variation, the time locations can be "overstressed" to stretch the system a bit. For example, if only 80-byte packets are actually needed, 160-byte packets could be transmitted during the test phase to represent an overloaded condition. The overloaded condition might reveal bottlenecks where the normal 80-byte packets might not.

Rather than the recipient sending back time-stamped packets, the recipient could instead perform statistics on collected test packets and send back a report identifying the latencies and dropped packet rates associated with each time location.

As explained above, packet header overhead has been ignored but would typically be included in the evaluation process (i.e., 80-byte packets would increase by the size of the packet header). Time location selection for the test packets could be determined randomly (i.e., a random selection of time locations for the test packets), or it could be determined based on previously used time interval locations. For example, if a transmitting node is already transmitting in time interval 3, it would know in advance that such a time interval might not be a desirable choice for a second connection. As another example, if the transmitting node is already transmitting in time location 3, the test packets could be transmitted in a time location that is furthest away from time location 3, in order to spread out as much as possible the packet distribution.

In step 506, a connection is established between the two endpoints and packets are transmitted using the higher "realtime" priority level and using the time location or locations that were determined to be more favorable for transmission. Because the higher priority level is used, the connections are not affected by test packets transmitted across the network, which are at a lower priority level. In one variation, the IP precedence field in IP packet headers can be used to establish the different priority levels.

Figure 6:
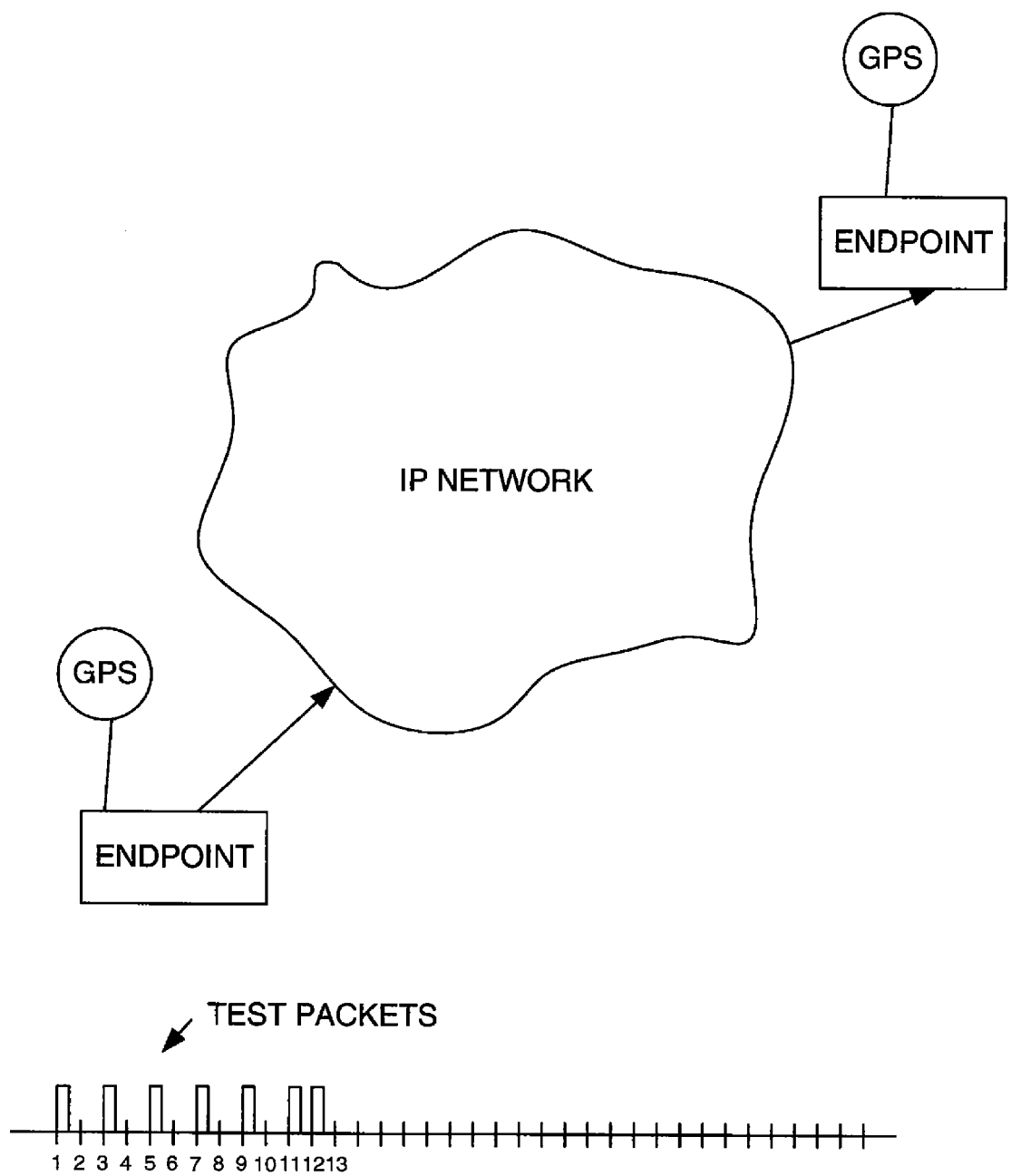
FIG. 6 shows a system using a delivery schedule for test packets from a first endpoint to a second endpoint.

FIG. 6 shows a system employing various principles of the invention. As shown in FIG. 6, two endpoints each rely on a GPS receiver for accurate time clock synchronization (e.g., for timestamping and latency determination purposes). The IP network may be comprised of a plurality of routers and/or other network devices that are able to ultimately route packets (e.g., IP or Ethernet packets) from one endpoint to the other. It is assumed that the organization configuring the network has the ability to control priority levels used on the network, in order to prevent other nodes from using the discovery priority level and realtime priority level. One or more devices may be interposed between each endpoint and the network elements (e.g., routers, proxy devices, or other devices as described below). Such devices may carry out the inventive principles to establish a connection instead of each endpoint directly performing such operations.

It should be appreciated that rather than transmitting test packets simultaneously during different time locations, a single location can be tested, then another, and so on, until an appropriate time location is found for transmission. This would increase the time required to establish a connection. Also, as described above, for a two-way connection, both endpoints would carry out the steps to establish the connection.

It should also be understood that the phase of all frames may be independent from one another; they need only be derived from a common clock. Different endpoints need not have frames synchronized with each other. Other approaches can of course be used.

The invention will also work with "early discard" settings in router queues since the empirical method would detect that a discard condition is approaching.

In one embodiment, packet latencies and packet dropped rates can be monitored during a connection between endpoints and, based on detecting a downward trend in either parameter, additional test packets can be transmitted to find a better time location in which to move the connection.

Figure 7:
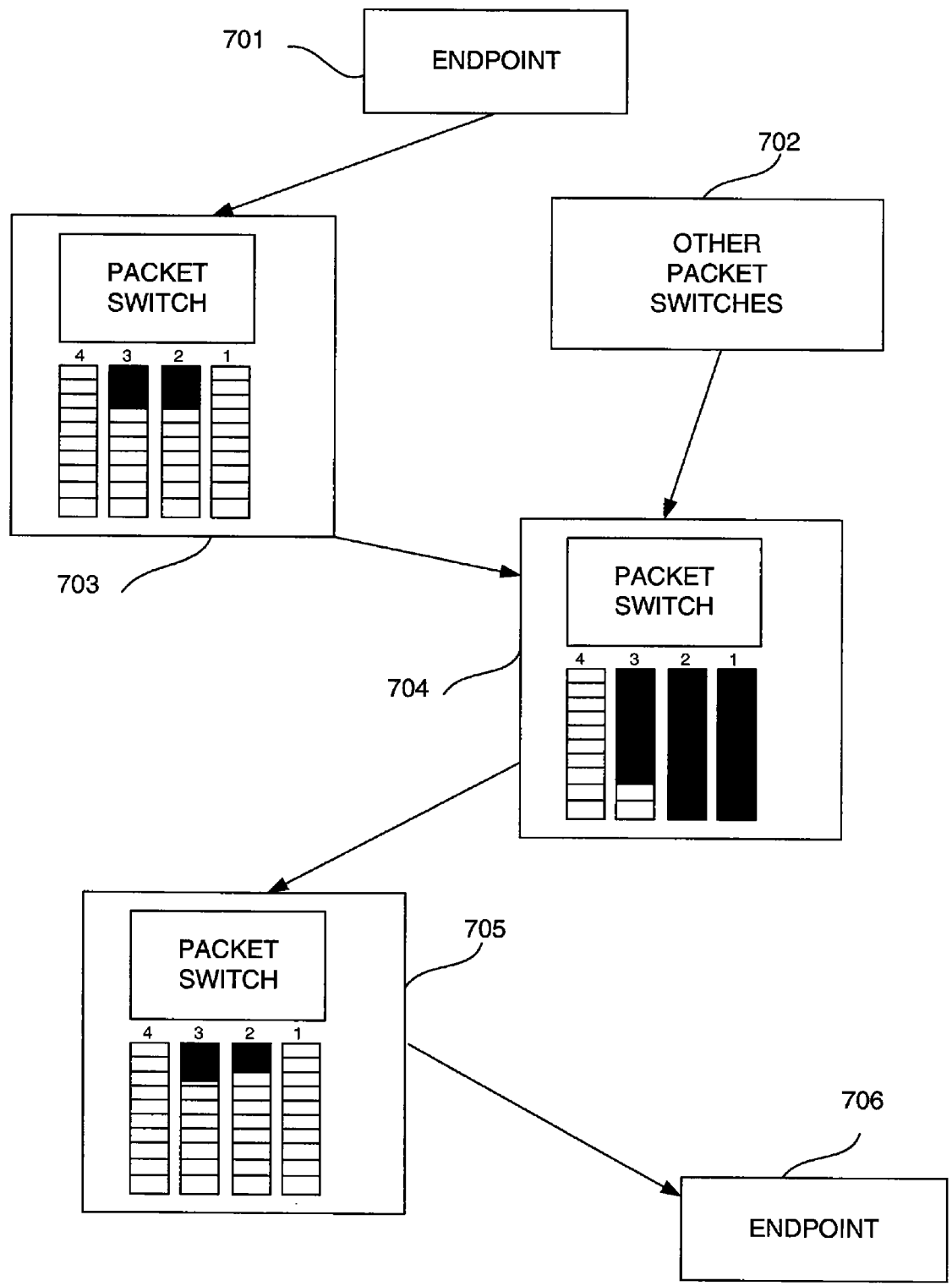
FIG. 7 shows a system wherein queues for realtime traffic (priority 3) are nearly full at one packet switch and yet the traffic still gets through the network.

FIG. 7 shows a system in which a first endpoint 701 communicates with a second endpoint 706 through a plurality of packet switches 703 through 705. Each packet switch maintains a plurality of packet queues (e.g., one per port). For illustrative purposes, four different priority levels are shown, wherein 4 is the highest level, and level 1 is the lowest level.

Assume that endpoint 701 attempts to initiate a connection with endpoint 706 through the network. Endpoint 701 transmits a plurality of "test" packets using priority level 2. As can be seen, packet switch 703 is lightly loaded and the queues have no difficulty keeping up with the traffic.

Packet switch 704, however, is heavily loaded. In that switch, the queue for priority level 1 traffic is full, leading to dropped packets, jitter, and packet latencies. Similarly, the test packets transmitted by endpoint 701 at priority level 2 cause that queue to overflow, causing dropped packets, jitter, and longer latencies. However, the priority level 3 queue (existing realtime traffic) is not yet full, so those packets are transported through the network unaffected at a given moment of time. In accordance with one embodiment of the invention, upon detecting that test packets sent during certain time locations are dropped and/or suffer from high latencies, endpoint 701 selects those time locations having either the lowest drop rate and/or the lowest latencies, and uses those time locations to schedule the packets (which are then transmitted using level 3 priority).

It is assumed that each endpoint in FIG. 7 comprises a node (i.e., a computer having a network interface) including computer-executable instructions for carrying out one or more of the above-described functions.

It should also be understood that the phase of all frames may be independent from one another; they need only be derived from or aligned with a common clock. Different endpoints need not have frames synchronized in phase with each other. In other words, each time interval need not be uniquely identified among different endpoints, as long as both endpoints can refer to the same relative time period. This principle is shown with reference to FIG. 11, which shows how two endpoints can refer to a time interval specified with reference to frames that have a different phase but which are referenced to a common clock.

Figure 11:
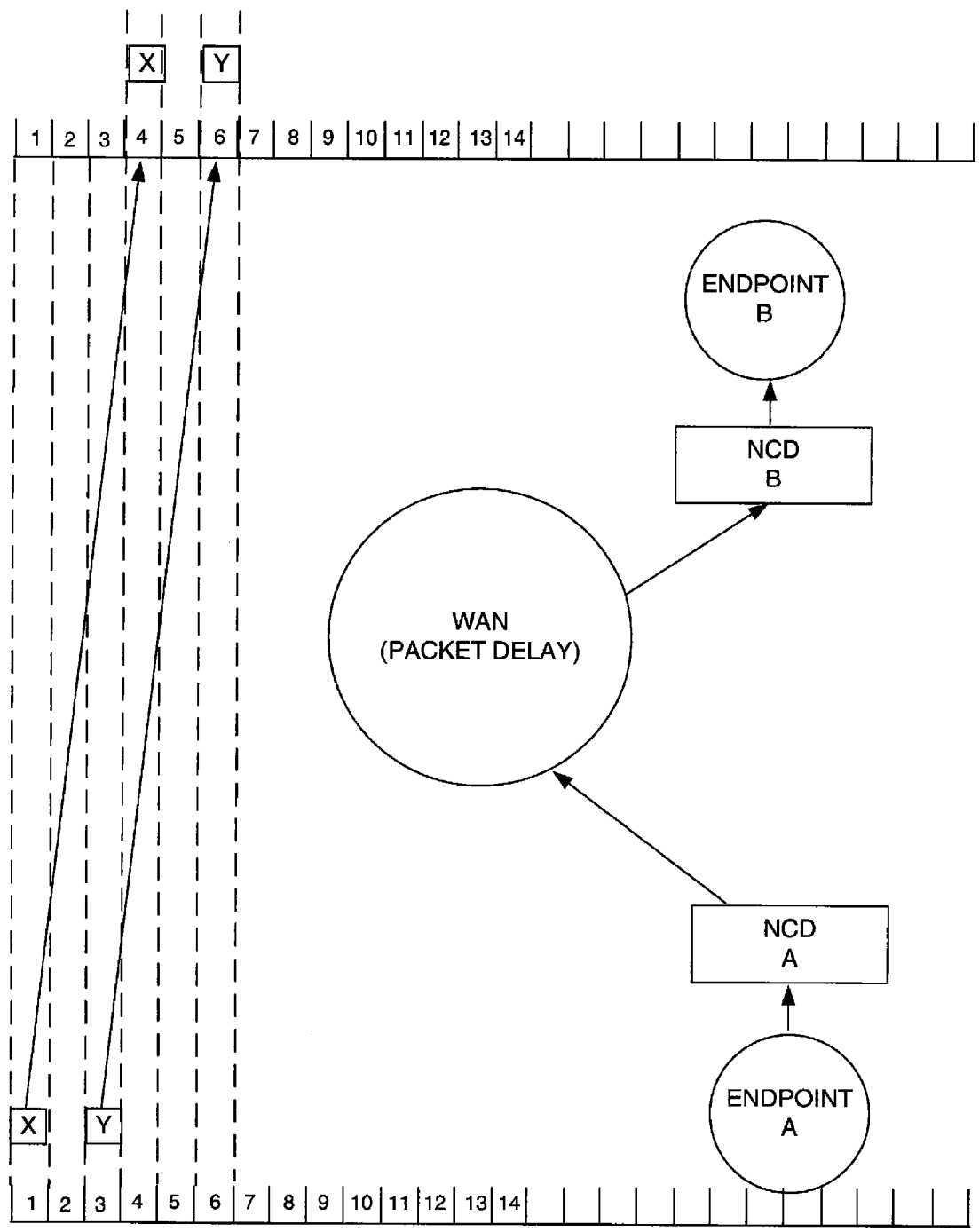
FIG. 11 shows how two endpoints can refer to a time interval specified with reference to frames that have a different phase but which are referenced to a common clock.

As shown in FIG. 11, suppose that endpoint A (bottom of FIG. 11) needs to communicate with endpoint B (top of FIG. 11) through a WAN that introduces a packet delay. Each endpoint has an associated Network Connection Device (NCD) that handles the connection with the WAN. (One possible such device is described in my copending U.S. application Ser. No. 10/962,521, entitled "Network Connection Device" and filed on Oct. 13, 2004). Suppose also that the timeline across the top of FIG. 11 and the timeline across the bottom of FIG. 11 represent "absolute" time; i.e., time interval 1 at the top of FIG. 11 appears at the same instant in absolute time as time interval 1 at the bottom of FIG. 11. Suppose further that NCD A transmits a first test packet X across the network during interval 1 and a second test packet Y across the network during time interval 3. Due to the packet delay introduced by the WAN, test packet X will not arrive at endpoint B until what endpoint B perceives to be time interval 4. Similarly, test packet Y will not arrive at endpoint B until what endpoint B perceives to be time interval 6. Yet endpoints A and B (through their respective network connection devices NCD A and NCD B) need to agree on what time interval future packets will be transmitted.

In short, when NCD B determines that test packet X was received with minimal delay, it informs NCD A that the test packet identified as "packet X" was empirically favorable for future transmissions. Thus, NCD A identifies the relevant time interval as interval 1, whereas NCD B identifies the relevant time interval as interval 4. Similarly, NCD A identifies the relevant time interval for packet Y as interval 3, whereas NCD B identifies the relevant time interval for packet Y as interval 6. As long as the timeline at the top of FIG. 11 and the timeline at the bottom of FIG. 11 do not move relative to each other, the system can accommodate packet delays and the endpoints (or their proxies) can agree on what time interval locations should be used to transmit packets. Other approaches can of course be used.

Figure 8:
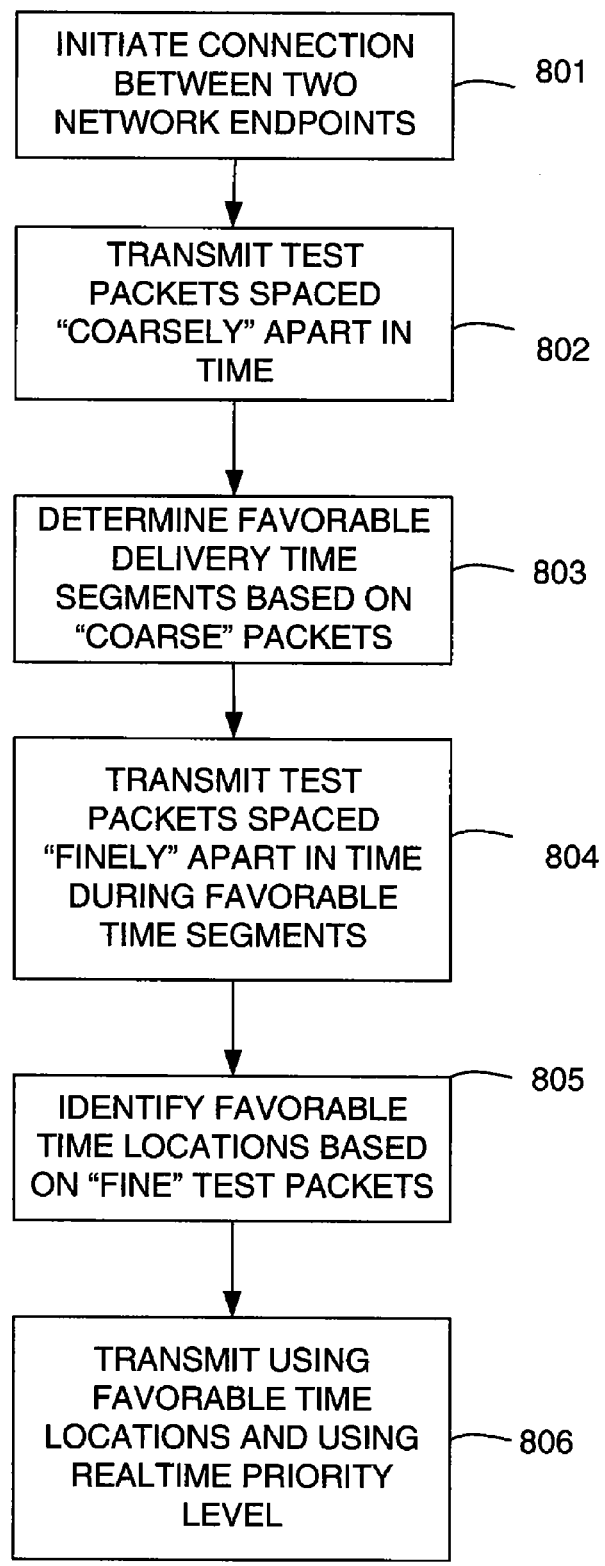
FIG. 8 shows one possible set of steps for transmitting coarsely spaced test packets followed by finely spaced test packets according to one method of the invention.

FIG. 8 shows various steps for performing a fine-grained discovery process using test packets according to another embodiment of the invention. According to this method, a transmitting endpoint first transmits test packets that are broadly spaced apart in time, in order to gauge which segments of time (such as subframes or secondary subframes) might be candidates for further exploration. Thereafter, the endpoint transmits test packets that are closely-spaced in time during one or more segments that were determined to be good candidates for further exploration. The results of the two-step testing process are used to schedule future packets for delivery. A third level of fine-grained testing is also possible.

Beginning in step 801, an endpoint in a network initiates a connection to another endpoint. As explained previously, the network may comprise a local area network (LAN) such as an Ethernet, or it may comprise a wide-area network (WAN) such as the Internet. Other network types of course may be used, and the invention is not intended to be limited in this respect.

Figure 9:
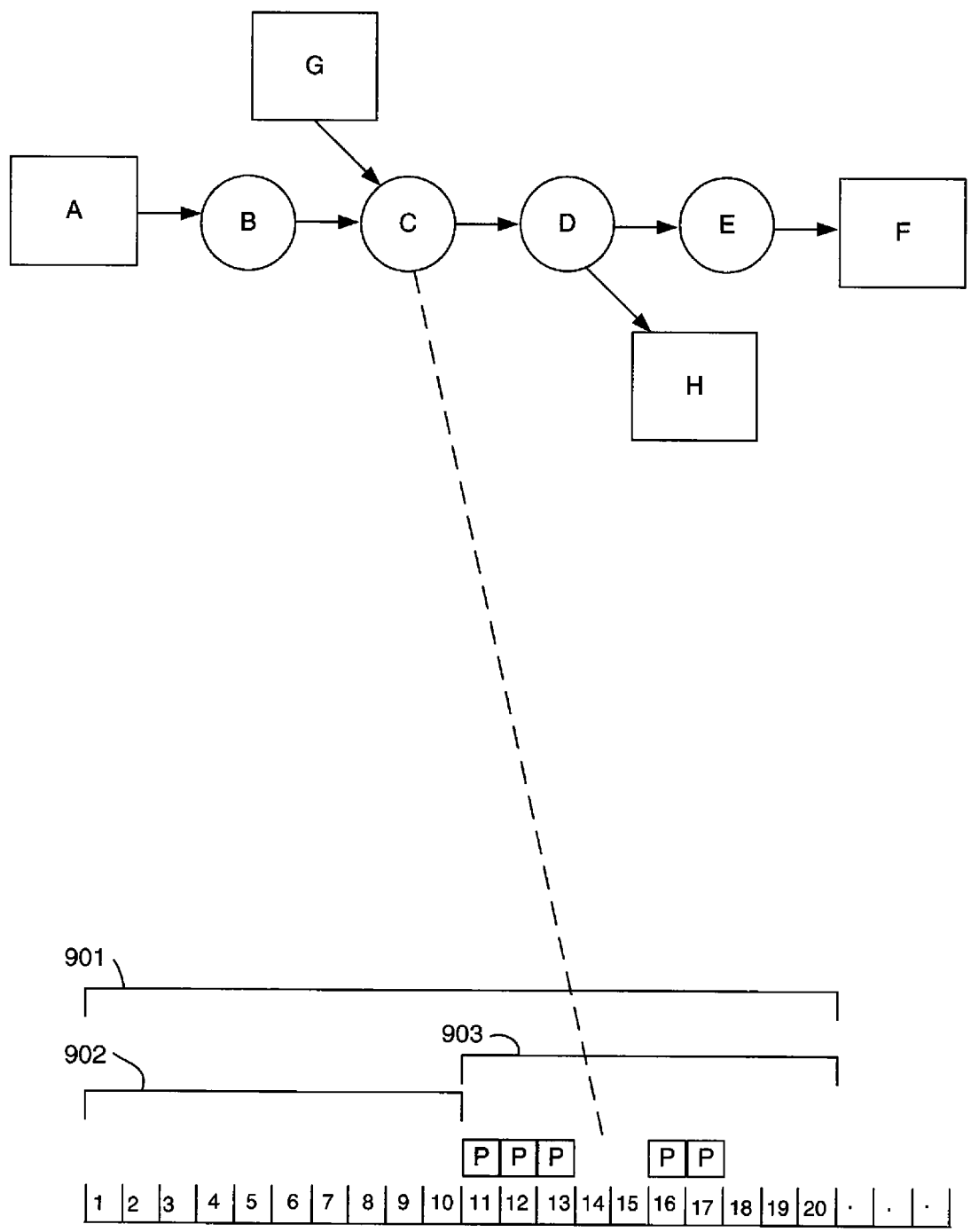
FIG. 9 shows a network over which a series of test packets are transmitted according to one embodiment of the invention.

In step 802, the endpoint (or another device acting on behalf of the endpoint) transmits test packets that are coarsely spaced apart in time. For example, as shown in FIG. 9, suppose that endpoint A is transmitting packets to endpoint F, and the path takes the packets through routers B, C, D, and E. Assume further that router C is transmitting packets during a time segment 903 (packets indicated by P in FIG. 9), and more specifically during time locations 11, 12, 13, and 16-17. Suppose that endpoint G needs to establish a virtual connection with endpoint H, which would take the packets through routers C and D. Since router C is already transmitting packets during intervals 11, 12, 13, and 16-17, according to one aspect of the invention, testing will be performed in order to identify favorable time locations in which to transmit the packets. However, in accordance with one embodiment, rather than broadly testing many different time interval locations, the packets are first transmitted during coarsely spaced time segments and the results of this coarse testing are evaluated before performing more finely-grained testing.

For example, as shown in FIG. 9, time segment 901 (which encompasses a plurality of smaller segments 902 and 903, each of which is made up of ten individual time locations) is first tested by transmitting one or more packets during time segment 901. Similarly, test packets are also transmitted during other "coarse" time segments (not shown in FIG. 9), and the results (packet loss rate and/or latencies, for example) are evaluated for these coarse time intervals. Suppose that it is determined that the test packets transmitted during coarse segment 901 were found to be more favorable than the test packets transmitted during other coarse segments (not shown in FIG. 9). According to step 803 of FIG. 8, endpoint G (or a proxy device acting on its behalf) would determine that coarse time segment 901 was favorable, but that further exploration was needed to narrow down those time locations within segment 901 for which packets should be transmitted.

In step 804, endpoint G transmits additional test packets that are more finely spaced apart during the candidate segment or segments (e.g., during segment 901 and/or more specifically optional segments 902 and 903) in order to identify those time interval locations that are favorable for transmission. In one embodiment of the invention, additional test packets are transmitted during different time interval locations falling within coarse time segment 901. In another embodiment of the invention, after transmitting a test packet or packets during coarse segment 901, additional test packets are transmitted during "fine" time segments 902 and 903 in order to determine (for example) that time segment 902 is more favorable for packet transmission than time segment 903, which already supports traffic. In step 805, the favorable time locations based on the finer-grained test packets are identified, and in step 806 the actual data packets are transmitted during those time locations.

This successively finer-grained exploration of packets can be carried out to any desired degree. The steps of FIG. 8 show a two-level testing process, but a three-level (or other multiple levels) are also within the scope of the inventive principles.

Figure 10A:
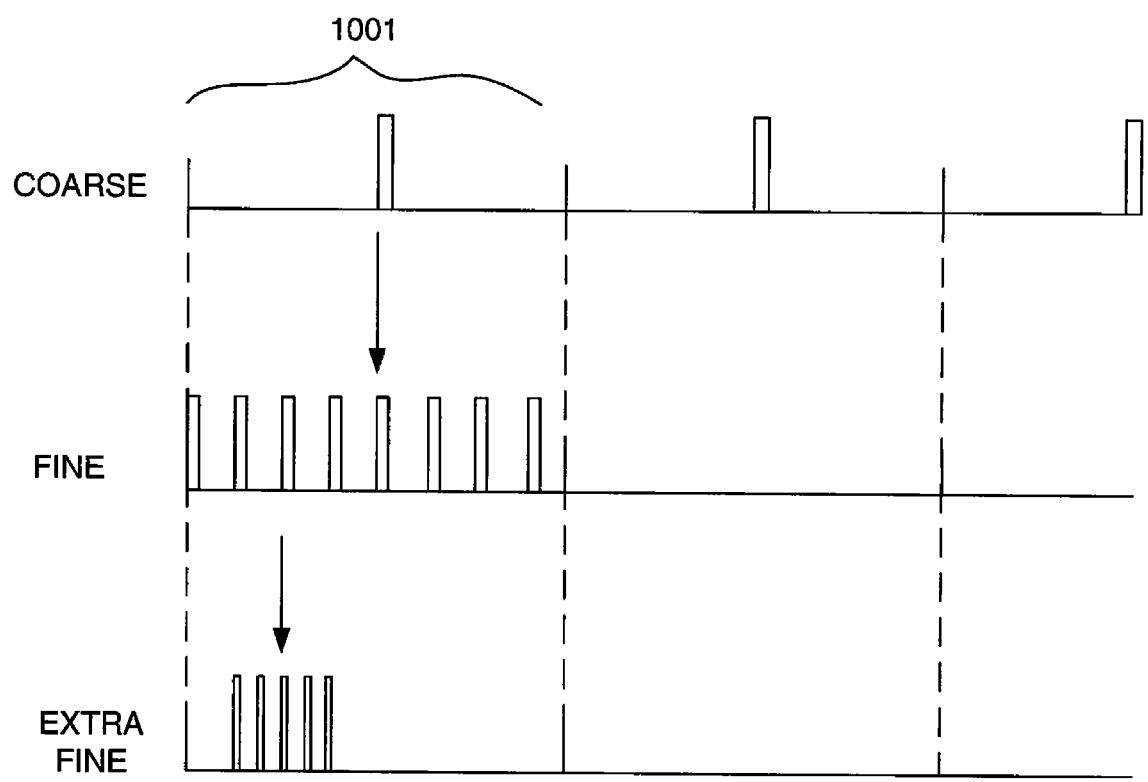
FIG. 10A shows transmission of coarse, fine, and extra-fine test packets according to one embodiment of the invention.

FIG. 10A shows the transmission of coarse, fine, and extra-fine test packets according to various principles of the invention. The top of FIG. 10A shows the transmission of one test packet during each of a plurality of "coarse" time segments. Each coarse time segment may correspond to a frame or a subframe as illustrated in FIG. 4, for example, but the invention is not limited in this respect. Other time segments could be used, and may comprise any arbitrary time period. For purposes of illustration, assume that coarse time segment 1001 corresponds to a subframe of 100-millisecond duration, such that a plurality of coarse segments 1001 equals one second of transmission time. Assume further that coarse time segment 1001 can be further decomposed into smaller segments (e.g., secondary subframes each of 10-millisecond duration), and so forth.

Suppose that after transmitting one test packet during each coarse time segment as shown in FIG. 10A, it is determined that coarse segment 1001 provided favorable packet transmission characteristics (e.g., a low latency and/or lowest dropped packet rate). Thereafter, according to one embodiment of the invention, a larger number of test packets are transmitted during this coarse segment, in order to determine which portions of time segment 1001 are most favorable for packet transmission. As shown in FIG. 10A, a plurality of additional fine-grained test packets are transmitted within coarse time segment 1001, and the results (e.g., latencies and/or dropped packet rates) are evaluated. As a further step, those portions of segment 1001 that provided the best packet transmission characteristics can be further explored using extra-fine-grained test packets as shown at the bottom of FIG. 10A. Once the location or locations of favorable time are identified, those locations can be used for the transmission of data packets (using the higher data packet transmission priority).

The test packets at the bottom of FIG. 10A are shown as being shorter (smaller) in duration, although the invention is not limited in this respect. For example, test packets transmitted during the coarse time segment may comprise 1,000-byte packets, whereas those transmitted during the fine and extra-fine time segments may comprise smaller (e.g., 500-byte and 100-byte) sizes respectively. Alternatively, the same packet size can be used during all testing periods. Moreover, although a single test packet is shown being transmitted during coarse time period 1001, a plurality of test packets can instead be transmitted during each coarse period. However, according to one embodiment of the invention, more packets are transmitted during the finer-grained testing periods in order to zero in on the favorable time locations for packet transmission. By "telescoping" down from a large number of sparsely-spaced test packets to a larger number of finely-spaced test packets, an endpoint can quickly identify favorable time locations for data packet transmission. The terms "coarse," "fine," and "extra-fine" are relative terms and are not intended to be limited to any numerical values. However, "coarse" packets are transmitted at more widely-spaced intervals than "fine" packets, and "fine" packets are transmitted at more widely-spaced intervals than "extra-fine" packets.

It should also be appreciated that the number of test packets and their size may be varied based on the bandwidth requirements for a desired connection. For example, if a bandwidth of 64 kilobits per second is needed to support a voice-over-IP connection, a packet size of 80 bytes (excluding packet header) might be used, and a packet transmission rate average of one packet every 10 milliseconds might be needed. After coarse-grained packet testing using an 80-byte packet size transmitted once during each coarse testing period, fine-grained test packets of 80 bytes transmitted once every 10 milliseconds during multiple fine time segments could be transmitted. Other variations are of course possible.

Figure 10B:
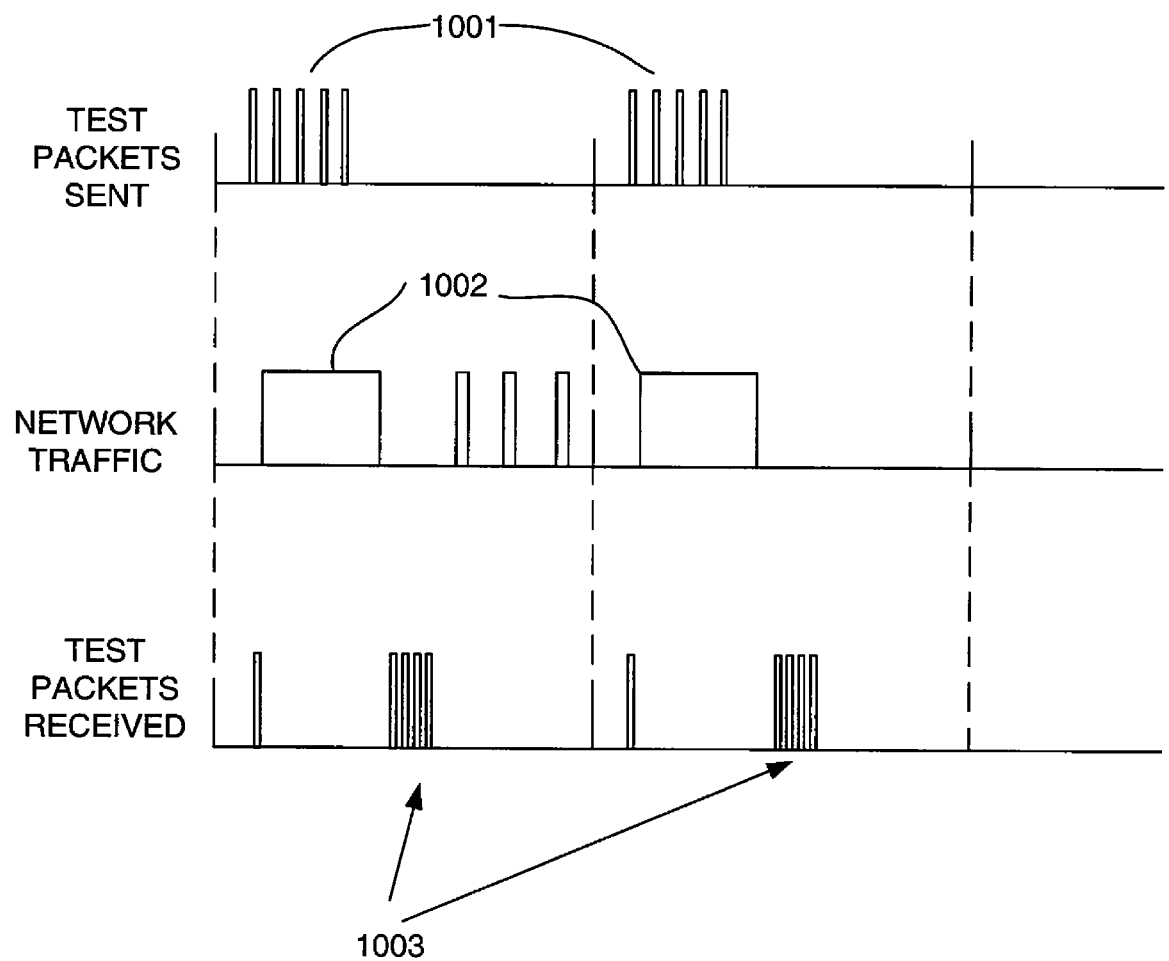
FIG. 10B shows transmission of fine test packets that permit an inference to be drawn regarding the location and length of existing packet traffic.

FIG. 10B shows the transmission of test packets and the resulting packet latencies that occur when some of the test packets are delayed due to existing packet traffic. As seen in FIG. 10B, five "fine-grained" test packets 1001 are transmitted during each time interval. Suppose that each packet is transmitted with a test packet sequence number (1, 2, 3, 4, and 5) and that each packet indicates the spacing between test packets (e.g., 3 milliseconds). As shown in FIG. 10B, suppose that existing network traffic includes a large packet 1002 that is transmitted during each time interval. The first test packet is received with little or no delay, but the remaining four test packets 1003 are delayed and bunched together in time due to the network traffic. The network traffic may have caused one or more queues in the network to back up, thus delaying test packets in the network.

According to one embodiment of the invention, the receiving node (or the transmitting node, if a statistics packet is returned to the transmitter) determines that some of the test packets were delayed, and can infer the existence of and the relative time location of the network traffic. It can thereafter schedule data packets to avoid the congested time period during each interval. This technique can be used for network diagnosis and testing, independently of using it for packet scheduling purposes. For example, the technique can be used to create network traffic congestion maps.

For example, suppose that each test packet is spaced apart by 3 milliseconds, and the first test packet is received without delay, but the second test packet is delayed by 12 milliseconds. Thus, instead of arriving as expected 3 milliseconds after the first test packet, it arrives 3+12=15 milliseconds later. It can be inferred from this circumstance that network traffic was present during the period of time spanning receipt of the first test packet to receipt of the second test packet, and this 12 millisecond period is congested. It can also be inferred that, because the second through fifth test packets were received bunched together (i.e., they are not spaced apart by 3 milliseconds but instead arrive less than 1 millisecond apart) that there was no congestion in the time period immediately after the congested period. This information can be used to schedule data packets in the network.

Although not explicitly shown above, the networks may include one or more soft phone switches (essentially a small computer coupled to the network) that maintains a database of phone numbers and maps them to IP addresses. To make a phone call to an intended recipient, the phone switch is contacted to determine the IP address corresponding to the recipient's telephone number. The inventive system and method may also be employed with video terminals to transmit video-grade data across networks; computer terminals that transmit computer data; or any other type of data.

Any of the method steps described herein can be implemented in computer software and stored on computer-readable medium for execution in a general-purpose or special-purpose computer or device (including PLDs, PGAs, etc.) and such computer-readable media is included within the scope of the intended invention. The special-purpose or general-purpose computer may comprise a network interface for communicating over a network to carry out various principles of the invention. Numbering associated with process steps in the claims is for convenience only and should not be read to require any particular ordering or sequence.

I claim:

1. A method of transmitting packets over a network, comprising:
    receiving a bandwidth requirement for transmitting packets over a network;
    from a first network endpoint, transmitting a first plurality of test packets over a single network path of the network to a second network endpoint during a first plurality of time locations that are spaced apart in time, wherein a transmission rate of the first plurality of test packets is determined based on the received bandwidth requirement;
    based on an evaluation of the first plurality of test packets, determining which of the first plurality of time locations corresponds to favorable network traffic conditions over the single network path; and
    scheduling data packets for transmission over the single network path of the network during one or more of the time locations corresponding favorable network traffic conditions, wherein the data packets are synchronized to a time reference frame at the first network endpoint.

2. The method of claim 1, further comprising:
    prior to scheduling the data packets for transmission, transmitting a second plurality of test packets over the single network path during a second plurality of time locations that are more finely spaced apart in time than the first plurality of time locations, wherein the second plurality of test packets are selected based on the determination of favorable network traffic conditions of the first plurality of time locations; and
    wherein the data packets are scheduled for transmission over the single network path of the network during one or more of the second plurality of time locations.

3. The method of claim 2, wherein the first plurality of test packets have a packet size that differs from the packet size of the second plurality of test packets.

4. The method of claim 2, further comprising:
    transmitting a third plurality of test packets during a third plurality of time locations that are more finely spaced apart in time the second plurality of time locations, wherein the third plurality of time locations are selected based on an evaluation of the second plurality of test packets;
    based on the evaluation of the second plurality of test packets determined which of the third plurality of time locations corresponds to favorable network traffic conditions; and
    based on the determination of which of the third plurality of time locations corresponds to favorable network traffic conditions, transmitting the data packets.

5. The method of claim 1, wherein the test packets are transmitted using a lower priority level than is used to transmit the data packets.

6. The method of claim 1, wherein the evaluating comprises evaluating packet latencies associated with the first plurality of test packets.

7. The method of claim 1, wherein the evaluating comprises evaluating a dropped packet rate associated with the first plurality of test packets.

8. The method of claim 1, wherein the evaluating comprises evaluating jitter associated with the first plurality of test packets.

9. The method of claim 1, wherein the evaluation of the first plurality of test packets is preformed by the first network endpoint, said evaluation comprising evaluating one of packet latencies, a dropped packet rate, and jitter associated with each of the first plurality of time locations.

10. The method of claim 1, wherein the evaluation of the first plurality of test packets is preformed by the second network endpoint, said evaluation comprising evaluating at least one of packet latencies, a dropped packet rate, and jitter associated with each of the first plurality of time locations.

11. The method of claim 1, wherein the test packets and the data packets comprise one of Internet Protocol (IP) and Ethernet packets transmitted over a packet-switched network.

12. The method of claim 11, wherein the data packets are scheduled for transmission during time locations within a frame that is synchronized to a clock.

13. The method of claim 1, wherein the test packets are transmitted at a priority level that is lower than the data packets, but higher than other data packets containing other data transmitted on the network.

14. The method of claim 1, wherein the data packets comprise one or more of voice data, video data, and real-time data.

15. The method of claim 1, wherein the test packets are transmitted for each side of a two-way connection between the first network endpoint and the second network endpoint.

16. The method of claim 1, wherein the network is a packet-switched network comprising packet switches that maintain packet queues.

17. The method of claim 1, further comprising;
    prior to transmitting the first plurality of test packets, partitioning a delivery schedule at the first network endpoint, the delivery schedule corresponding to the first plurality of time locations.

18. In a network comprising a plurality of packet switches, a method of transmitting data packets, comprising:
    establishing a time reference frame comprising a plurality of time locations during which packets are to be transmitted across the network;
    from a first network endpoint, empirically determining which of the plurality of time locations is associated with a reduced rate of packet congestion with respect to an intended recipient second network endpoint by transmitting over a single network path through the network a plurality of test packets that are spaced apart in time, wherein a transmission rate of the plurality of test packets is determined based on a received bandwidth requirement; and
    synchronously scheduling for transmission a plurality of data packets over the single network path from the first network endpoint to the second network endpoint during one or more time locations empirically determined to be associated with the reduced rate of packet congestion.

19. The method of claim 18, wherein the test packets are transmitted using a packet priority level lower than a packet priority level used to schedule the plurality of data packets.

20. An apparatus comprising:
    a computer; and
    a computer-readable medium having stored therein computer-executable instructions that, when executed, perform:
    transmitting a first plurality of test packets through a network interface and over a single network path in the network to an intended recipient during a first plurality of time locations that are spaced apart in time, wherein a transmission rate of the first plurality of test packets is determined based on the received bandwidth requirement;

based on an evaluation of the first plurality of test packets, determining which of the first plurality of time locations corresponds to favorable network traffic conditions; and scheduling data packets for transmission through the network interface and over the single network path during the one or more of the time locations corresponding to favorable network traffic conditions, wherein the data packets are synchronized to a time reference frame.

21. The apparatus of claim 20, wherein the evaluation comprises evaluating at least one of packet latencies, dropped packet rates, and packet jitter with a second apparatus connected to the network.

22. The apparatus of claim 20, wherein the test packets are transmitted using a lower priority level than is used to transmit the data packets.

23. The apparatus of claim 20, wherein the evaluating comprises evaluating packet latencies associated with the first plurality of test packets.

24. The apparatus of claim 20, wherein the evaluating comprises evaluating dropped packet rates associated with the first plurality of test packets.

25. The apparatus of claim 20, wherein the evaluating comprises evaluating packet jitter associated with the first plurality of test packets.

26. The apparatus of claim 20, wherein the data packets are scheduled for transmission during time locations within a frame that is synchronized to a clock.

27. The apparatus of claim 20, wherein the test packets are transmitted at a priority level that is lower than the data packets, but higher than other data packets containing other data transmitted on the network.

28. The apparatus of claim 20, wherein the data packets comprise one or more of voice data, video data, and real-time data.

29. The apparatus of claim 20, wherein the computer-executable instructions further perform transmitting a second plurality of test packets during a second plurality of time locations that are more finely spaced apart in time than the first plurality of test packets, wherein the first plurality of test packets have a packet size that differs from the packet size of the second plurality of test packets.

30. The apparatus of claim 29, wherein the computer-executable instructions further perform:

transmitting a third plurality of test packets during a third plurality of time locations that are more finely spaced apart in time than the second plurality of time locations, wherein the third plurality of time locations are selected based on an evaluation of the second plurality of test packets;

based on the evaluation of the second plurality of test packets, determining which of the third plurality of time locations corresponds to favorable network traffic conditions; and based on the determination of which of the third plurality of time locations corresponds to favorable network traffic conditions, transmitting the data packets.

31. The apparatus of claim 29, wherein the first plurality of test packets are transmitted during a first time segment spanning a plurality of time locations; and wherein the second plurality of test packets are transmitted during a subset of the first time segment.

32. The apparatus of claim 20, wherein the computer-executable instructions further perform:

prior to transmitting the first plurality of test packets, partitioning a delivery schedule at the apparatus, the delivery schedule corresponding to the first plurality of time locations.

33. A computer-readable medium comprising computer executable instructions which, when executed, perform:

receiving a bandwidth requirement for transmitting packets over a network;

from a first network endpoint, transmitting a first plurality of test packets to a second network endpoint over a single network path of a network during a first plurality of time locations that are spaced apart in time, wherein a transmission rate of the first plurality of test packets is determined based on the received bandwidth requirement;

based on an evaluation of the first plurality of test packets, determining which of the first plurality of time locations corresponds to favorable network traffic conditions over the single network path; and scheduling data packets for transmission to the second network endpoint over the single network path of the network during one or more of the time locations corresponding to favorable network traffic conditions, wherein the data packets are synchronized to a time reference frame at the first network endpoint.

34. The computer-readable medium of claim 33, wherein the test packets are transmitted using a lower priority level than is used to transmit the data packets.

35. The computer-readable medium of claim 33, wherein the evaluating comprises evaluating packet latencies associated with the first plurality of test packets.

36. The computer-readable medium of claim 33, wherein the evaluating comprises evaluating a dropped packet rate associated with the first plurality of test packets.

37. The computer-readable medium of claim 33, wherein the evaluating comprises evaluating packet jitter associated with the first plurality of test packets.

38. The computer-readable medium of claim 33, wherein the evaluation of the first plurality of test packets is performed by transmitting node, said evaluation comprising evaluating at least one of packet latencies, a dropped packet rate, and jitter associated with each of the first plurality of time locations.

39. The computer-readable medium of claim 33, wherein the evaluation of the first plurality of test packets is performed by a receiving node, said evaluation comprising evaluating at least one of packet latencies, a dropped packet rate, and jitter associated with each of the first plurality of time locations.

40. The computer-readable medium of claim 33, wherein the test packets and the data packets comprise one of Internet Protocol (IP) and ethernet packets transmitted over a packet-switched network.

41. The computer-readable medium of claim 40, wherein the data packets are scheduled for transmission during time locations within a frame that is synchronized to a clock.

42. The computer-readable medium of claim 33, wherein the test packets are transmitted at a priority level that is lower than the data packets, but higher than other data packets containing other data transmitted on the network.

43. The computer-readable medium of claim 33, wherein the data packets comprise one or more of voice data, video data, and real-time data.

44. The computer-readable medium of claim 33, wherein the test packets are transmitted for each side of a two-way connection between two nodes in the network.

45. The computer-readable medium of claim 33, wherein the network is a packet-switched network comprising packet switches that maintain packet queues.

46. The computer-readable medium of claim 33, wherein the instructions, when executed, further cause a second plurality of test packets to be transmitted over the single network path during a second plurality of time locations, wherein the first plurality of test packets have a packet size that differs from the packet size of the second plurality of test packets.

47. The computer-readable medium of claim 46, wherein the instructions, when executed, further perform:

transmitting a third plurality of test packets during a third plurality of time locations that are more finely spaced apart in time than the second plurality of time locations, wherein the third plurality of time locations are selected based on an evaluation of the second plurality of test packets;

based on the evaluation of the second plurality of test packets, determining which of the third plurality of time locations corresponds to favorable network traffic conditions; and based on the determination of which of the third plurality of time locations corresponds to favorable network traffic conditions, transmitting the data packets.

48. The computer-readable medium of claim 33, wherein the instructions, when executed, further perform:

prior to transmitting the first plurality of test packets, partitioning a delivery schedule at the first network endpoint, the delivery schedule corresponding to the first plurality of time locations.

* * * * *